United States Patent [19]

Lessig, III et al.

[11] 4,008,559
[45] Feb. 22, 1977

[54] SAFETY DEFLECTOR ASSEMBLY FOR POWER LAWN DISCHARGE CHUTE

[75] Inventors: William Ralph Lessig, III; Allen George Beares, both of Towson, Md.

[73] Assignee: The Black and Decker Manufacturing Company, Towson, Md.

[22] Filed: Feb. 26, 1974

[21] Appl. No.: 445,872

[52] U.S. Cl. .................... 56/320.2; 56/202
[51] Int. Cl.² ............................ A01D 75/20
[58] Field of Search ............. 56/320.2, 202, 17.4; 280/150 R

[56] References Cited
UNITED STATES PATENTS

| 3,186,152 | 6/1965 | Epstein | 56/202 |
| 3,423,918 | 1/1969 | Siwek | 56/202 |
| 3,721,078 | 3/1973 | Haffner | 56/202 |
| 3,726,069 | 4/1973 | Cope | 56/202 |
| 3,760,572 | 9/1973 | Marion et al. | 56/320.2 |
| 3,872,656 | 3/1975 | Dahl | 56/320.2 X |

Primary Examiner—J.N. Eskovitz
Attorney, Agent, or Firm—Joseph R. Slotnik; Edward D. Murphy; Leonard Bloom

[57] ABSTRACT

A safety deflector assembly for the discharge chute of a power lawn mower is provided. The deflector assembly comprises a deflector or guard plate pivotally mounted on the mower deck adjacent to the discharge chute and normally biased toward a guard position, and a latching mechanism automatically operable upon movement of the deflector to its guard position located in the path of movement of material discharged from the discharge chute for latching the deflector in its guard position. The latching mechanism is manually operable to unlatch the deflector to permit manual movement of the deflector away from its guard position out of the path of movement of the discharged material to permit attachment of a grass catcher to the discharge chute.

8 Claims, 6 Drawing Figures

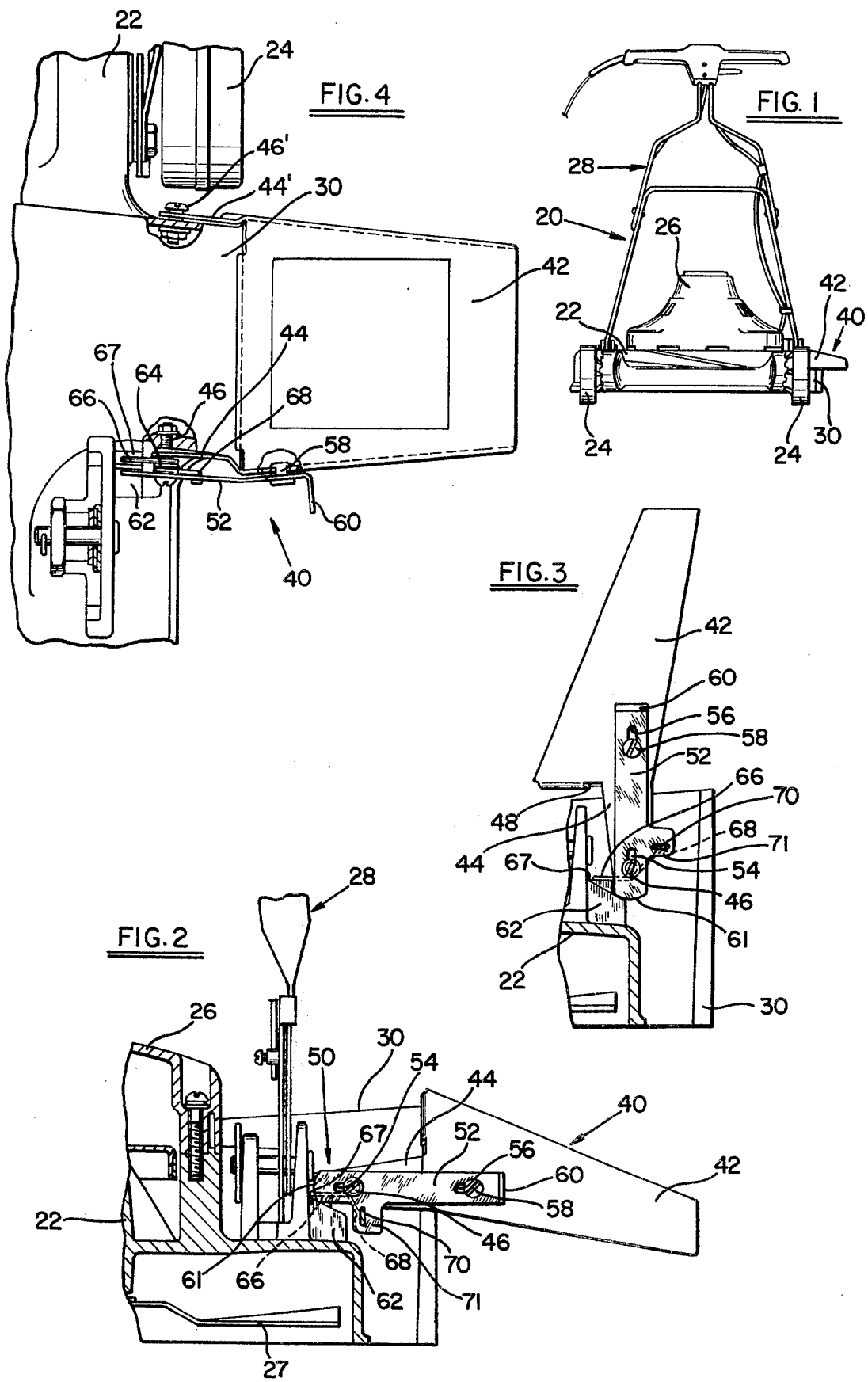

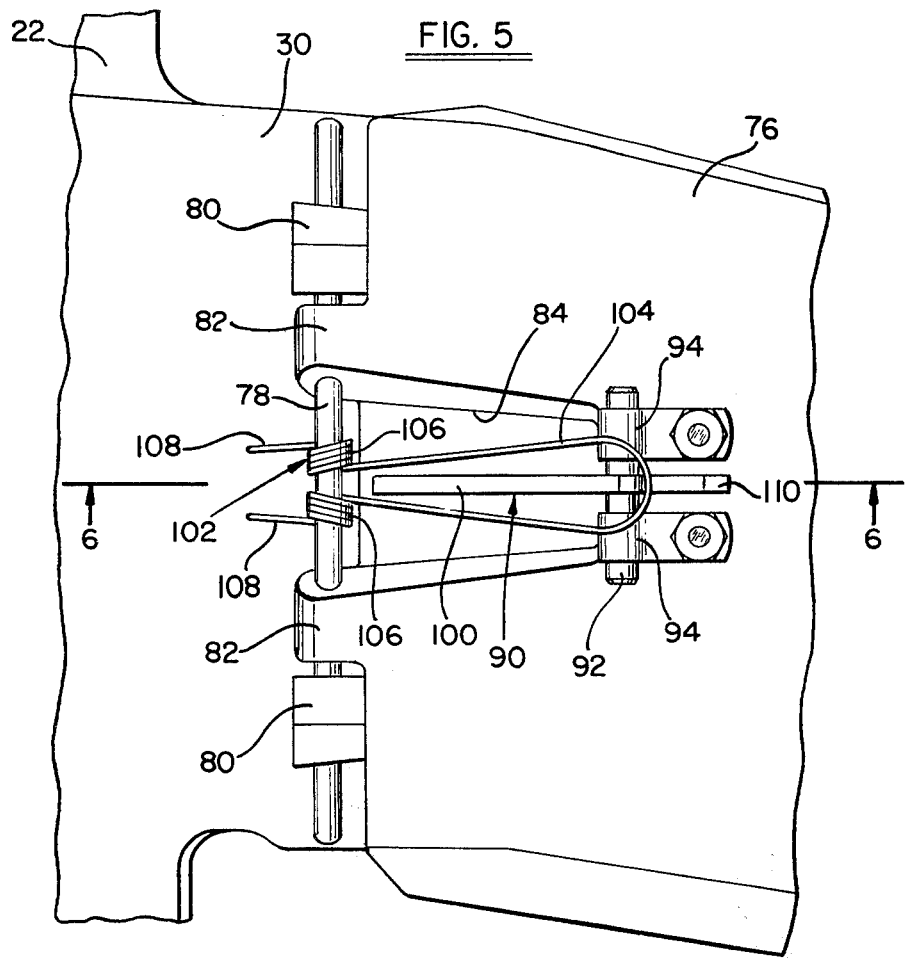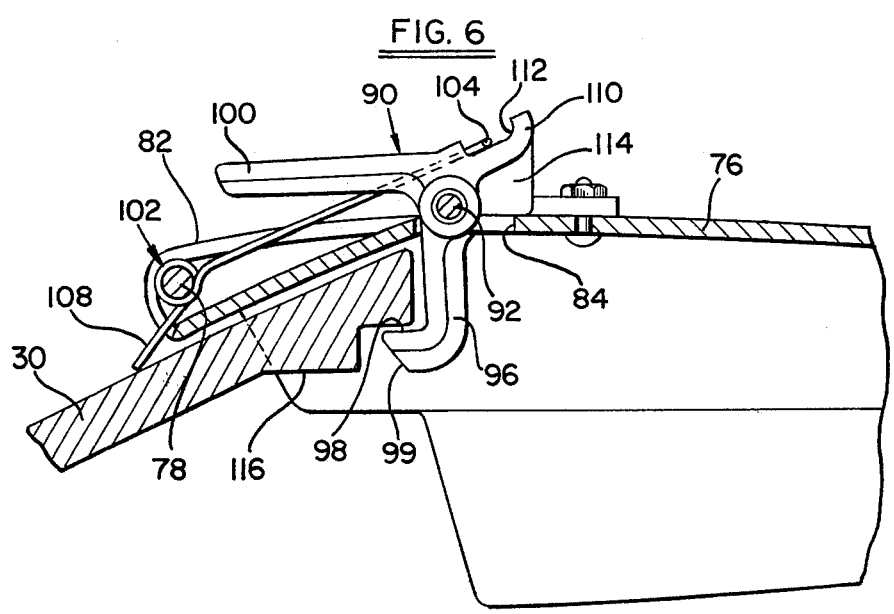

SAFETY DEFLECTOR ASSEMBLY FOR POWER LAWN DISCHARGE CHUTE

The present invention relates to a safety deflector assembly for the discharge chute of a power lawn mower and, more particularly, to a safety deflector assembly for a rotary power mower including a discharge guard plate and latching mechanism to automatically return the guard plate and latch it in a guard position relative to the discharge chute.

A rotary power lawn mower generally includes a mower body or deck which supports a motor, e.g., an electric motor or internal combustion engine, and one or more rotary grass cutting blades driven by the motor. The mower body or deck is usually provided with a lateral discharge chute for discharging cut grass and other material thrown outwardly by the rotary blades. Since the rotary lawn mower is usually capable of discharging solid objects, e.g., stones and twigs, at relatively high velocity, it is desirable to provide some means always in place to deflect the discharge of these solid objects downwardly when the mower is used without a grass catcher so that possible injury is prevented. It is also desirable that this deflector be inactive when a grass catcher is used. Furthermore, an operator's foot should not be capable of entering the blade path through the discharge chute.

During recent years, it has become customary to provide a discharge guard plate or deflector adjacent to the discharge chute of a power lawn mower to deflect material discharged from the chute toward the ground when the mower is used without a grass catcher. Typically, the guard plate is pivotally mounted on the mower deck above the discharge chute. The guard plate is normally biased, by gravity or spring elements, to a downward, guard position located in the path of movement of material discharged from the discharge chute. The guard plate is manually movable to an upward, unguard position out of the path of movement of the discharged material to permit a catcher or collector bag to be attached to the discharge chute.

The discharge guard plates of the prior art have not, in general, included any type of latching mechanism to retain the guard plate in its downward, guard position. Thus, it has been possible to move the discharge guard plate away from its guard position, e.g., by movement of the guard plate into contact with shrubs, ground cover, or other obstructions, or by a solid object emerging from the discharge chute and striking the guard plate. Consequently, it is essential to complete safety in the operation of the power mower to provide a deflector assembly which is automatically and positively latched in its guard position and is not susceptible to inadvertent movement away from its guard position. As a further safeguard, it is important to provide a deflector assembly which is not susceptible to unlatching by objects or material thrown outwardly through the discharge chute.

Accordingly, it is an object of the present invention to provide a safety deflector assembly for the discharge chute of a power lawn mower which provides improved protection against accidental injury by material discharged from the discharge chute, and which prevents an operator's foot from entering the blade path through the discharge chute.

It is also an object of the present invention to provide a discharge guard assembly for the discharge chute of a rotary power lawn mower including a deflector or guard plate mounted on the mower body adjacent to the discharge chute and normally biased toward a guard position, and a latching mechanism automatically operable upon movement of the guard plate to its guard position located in the path of movement of material discharged from the discharge chute for latching the guard plate in its guard position to deflect the discharge material toward the ground and protect an operator's foot.

It is another object of the present invention to provide a guard plate assembly for the discharge chute of a rotary power lawn mower including a pivotal deflector or guard plate mounted on the mower body adjacent to the discharge chute and a latching mechanism on the guard plate which is automatically operable upon movement of the guard plate to a guard position for engaging the mower body to latch the guard plate in its guard position.

It is an additional object of the present invention to provide a guard plate assembly for the discharge chute of a rotary power lawn mower including a latching mechanism which is not susceptible to accidental unlatching by objects discharged from the chute.

It is a further object of the present invention to provide a guard plate assembly which consists of a minimum number of components to minimize the cost of manufacture of the assembly.

The present invention provides a deflector assembly for a power lawn mower including a mower body provided with a discharge chute comprising a guard plate mounted on the mower body for movement toward and away from a guard position located in the path of movement of material discharged from the discharge chute but normally biased toward its guard position, and a latching mechanism automatically operable upon movement of the guard plate to its guard position for latching the guard plate in its guard position to deflect the discharged material toward the ground. The latching mechanism is manually operable to unlatch the guard plate to permit manual movement of the guard plate away from its guard position out of the path of movement of the discharged material. Preferably, the guard plate is pivotally mounted on the mower body adjacent to the discharge chute. The latching mechanism is located on the guard plate and is engageable with the mower body to latch the guard plate in its guard position to deflect the discharged material downward and protect an operator's foot.

A first embodiment of the latching mechanism comprises a lever slidably mounted on the guard plate. The lever is normally biased to a latching position in engagement with a stop on the mower body to latch the guard plate in its guard position. The lever is manually slidable to a non-latching position out of engagement with the stop to allow the guard plate to pivot from its guard position to its unguard position. A second embodiment of the latching mechanism comprises a lever pivotally mounted on the guard plate adjacent to the edge of the discharge chute. The lever is normally biased to a latching position and includes a locking portion for normally engaging the edge of the discharge chute to latch the guard plate in its guard position. The lever is manually pivotable to a non-latching position with its locking portion out of engagement with the edge of the discharge chute to allow the guard plate to pivot from its guard position to its unguard position. In both embodiments of the latching mechanism, a common spring element is provided for normally biasing the guard plate to its guard position and the lever to its latching position.

The accompanying drawings illustrate preferred embodiments of the invention and, together with the description, serve to explain the principles of the invention.

Of the drawing:

FIG. 1 is a rear elevation of a rotary power lawn mower including a deck provided with a discharge chute and a deflector assembly including a guard constructed according to the principles of the present invention, the guard being shown in the guard position;

FIG. 2 is an enlarged view, partly in section, of a portion of the lawn mower deck illustrating a first embodiment of the safety deflector assembly including a guard plate pivotally mounted on the deck and a latching lever slidably mounted on the guard plate to normally latch the plate in a guard position in the path of movement of material discharged from the discharge chute;

FIG. 3 is an enlarged view, similar to FIG. 2, illustrating the guard plate moved to an upward, unguard position out of the path of movement of material discharged from the discharge chute, pursuant to attaching a grass catcher to the discharge chute;

FIG. 4 is a top plan view of the structure of FIG. 2;

FIG. 5 is a plan view of a second embodiment of the safety deflector assembly incorporating a guard plate pivotally mounted on the mower deck adjacent to the discharge chute and a latching lever pivotally mounted on the guard plate adjacent to the edge of the discharge chute; and FIG. 6 is a sectional view of the guard plate taken along lines 6—6 of FIG. 5.

Referring to FIG. 1, a rotary power lawn mower, generally 20, includes a mower body or deck 22 supported for movement along the ground by a plurality of wheels 24. The deck 22 supports a motor housing 26 which contains an electric motor (not shown) for driving one or more rotary grass cutting blades 27. A handle assembly 28 is pivotally connected to the mower deck to allow an operator to push the power mower along the ground. A conventional discharge chute 30 is integrally formed on mower body or deck 22 for discharging cut grass and other material thrown outwardly by the rotary blades.

The power lawn mower is provided with a safety deflector assembly, generally 40, mounted on the mower deck adjacent to discharge chute 30. The deflector assembly includes a discharge guard plate or deflector 42 pivotally mounted on the mower deck above discharge chute 30. As shown in FIG. 4, the lateral edge of deflector 42 is bent downwardly to provide an arm 44 extending backward beyond the rear edge of the deflector. A pivot pin 46 is mounted on the discharge chute and received in an opening provided in the extended end of arm 44 to support deflector 42 for pivotal movement relative to the mower body. A similar arm 44' and pivot pin 46' are provided on the opposite edge of the deflector. A downwardly extending flange 48 is provided at the rear edge of deflector 42 for engaging the top of discharge chute 30. With flange 48 in contact with the top of the discharge chute, deflector 42 is located in a downwardly inclined, guard position in the path of movement of material discharged from discharge chute 30 to deflect the material downward. The deflector is pivotable about pivot pin 46 away from its downward, guard position to an upward, unguard position (FIG. 3) out of the path of movement of the discharged material.

In accordance with the invention, the safety deflector assembly includes a latching mechanism automatically operable upon movement of the guard plate to its guard position for latching the plate in its guard position to deflect the discharged material toward the ground. The latching mechanism is manually operable to unlatch the guard plate to permit manual movement of the guard plate away from its guard position out of the path of movement of the discharged material. Referring to FIG. 2, a latching mechanism, generally 50, is embodied as a lever 52 slidably mounted on arm 44 of guard plate or deflector 42. Lever 52 includes first and second spaced elongated slots 54 and 56, respectively. First elongated slot 54 receives pivot pin 46 while second elongated slot 56 receives a fastener 58 mounted on arm 44 of the deflector at a location spaced from the pivot pin. Pin 46 and fastener 58 thus support lever 52 for slidable movement relative to arm 44 of the deflector.

As shown in FIG. 2, the righthand end of lever 52 is provided with a flange 60 extending perpendicularly outward from the lever to facilitate manual movement of the lever. The lefthand end of lever 52 includes a curved edge 61 the bottom of which normally rests on a tapered stop 62 provided on the mower deck to latch the guard plate or deflector in its guard position.

Biasing means in the form of a spring element 64 is provided to normally bias guard plate or deflector 42 to its guard position and lever 52 to its latching position. As shown in FIG. 4, spring element 64 includes a coil portion wound around pivot pin 46 with a first arm 66 extending leftwardly from the coil portion and resting on a surface 67, and a second spring arm 68 extending downwardly from the coil portion and received in a slot 70 provided in an extension 71 in lever 52. As shown in FIG. 2, arms 66 and 68 of spring element 64 are positioned to apply a restoring force on deflector 42 to normally bias the deflector downward to its guard position, and to apply a restoring force on lever 52 to normally bias the lever to a latching position with the bottom of its curved edge 61 resting on the top of stop member 62.

When it is desired to move deflector 42 upward away from its guard position, the operator first engages flange 60 with his finger to slide lever 52 rightward, as seen in FIG. 2, to move its edge 61 out of engagement with stop member 62. Thereafter, using lever 52, the operator can manually pivot deflector 42 about pivot pin 46 against the bias of spring element 64 to move the deflector to its unguard position (FIG. 3). During this movement of deflector 42, the edge 61 of lever 52 remains in position to engage with stop member 62. This upward movement of the deflector permits the operator to attach a collector bag (not shown) to discharge chute 30. Subsequently, when the collector bag is removed and deflector 42 is released by the operator, spring element 64 automatically returns the deflector downward to its guard position. During the downward movement of deflector 42, curved edge 61 of lever 52 cammingly slides along the stop member 62 until deflector 42 is returned to its guard position, whereupon spring element 64 biases the lever leftward to its latching position (FIG. 2) with the bottom of curved edge 61 of lever 52 resting on top of stop member 62. The taper on stop member 62 assures secure retention of the deflector 42 in its guard position independently of tolerance build up in the parts.

FIGS. 5 and 6 illustrate an alternative embodiment of the safety deflector assembly including a deflector or guard plate 76 pivotally mounted on mower deck 22 by a shaft 78 received in a pair of journal supports 80 provided on the mower deck and a pair of ears 82 integrally formed on the deflector. An opening 84 is provided in the deflector adjacent to the edge of the discharge chute.

The alternative embodiment includes a latching mechanism, generally 90, in the form of a lever pivotally mounted on the deflector or guard plate adjacent to the edge of the discharge chute. As shown in FIG. 5, lever 90 is supported for pivotal movement on a shaft 92 which is received in a second pair of journal supports 94 provided on deflector 76 adjacent to opening 84. Referring to FIG. 6, lever 90 includes a latching arm 96 extending downwardly through opening 84 in deflector 76 with a lower hook end 98 for engaging the edge of discharge chute 30 to normally prevent upward pivotal movement of the deflector from its guard position. In addition, lever 90 includes a manually engageable actuator arm 100 extending horizontally over deflector 76 toward the mower body to permit manual operation of the lever to pivot hook end 98 of latching arm 96 out of engagement with the edge of the discharge chute to allow pivotal movement of the deflector 76 upward from its guard position to an unguard position. An inclined cam surface 99 is provided on hook end 98 of the latching arm.

The safety deflector assembly of the alternative embodiment includes biasing means in the form of a spring element 102 (FIG. 5) to bias deflector or guard plate 76 downward to its guard position and lever 90 into its latching position. Spring element 102 comprises a single spring wire which is bent to provide a loop 104, a pair of coil portions 106 wound around shaft 78, and a pair of free ends 108 engaging the top of the mower deck. The spring element applies a relatively large restoring force to guard plate 76 and a relatively small restoring force to lever 90.

As shown in FIGS. 5 and 6, lever 90 includes a leg 110 extending over deflector 76 away from the mower body. A notch 112 is formed in the surface portion of leg 110 for receiving loop 104 of the spring element. Leg 110 is provided with a downwardly extending rib 114 for engaging the deflector plate to define the latching position of lever 90. It will be appreciated that spring 102 acts on guard 76 developing a relatively large lever arm about pivot pin 78, and a correspondingly large restoring force on guard 76. However, spring 102 acts upon lever 90 with a relatively small lever arm about its pivot 92, and a correspondingly small restoring force.

In the operation of the safety deflector assembly of FIGS. 5 and 6, spring element 102 normally maintains deflector 76 downward in its guard position and lever 90 in its latching position. As shown in FIG. 6, loop portion 104 of the spring element acts simultaneously on lever 90 and deflector 76 to maintain the deflector downward in its guard position and the lever in its latching position with its hook end 98 underneath the edge of discharge chute 30. When it is desired to raise deflector 76 away from its guard position, actuator arm 100 of lever 90 is manually operated to pivot the lever in a counterclockwise direction, as viewed in FIG. 6, to move hook end 98 away from the edge of discharge chute 30. Thereafter, deflector 76 can be pivoted manually about shaft 78 to raise the deflector away from its guard position to an upward, unguard position. Subsequently, when deflector 76 is released, spring element 102 automatically returns the deflector downward to its guard position and urges lever 90 to its latching position with hook end 98 located underneath the edge of discharge chute 30. During return movement of the deflector to its guard position, cam surface 99 of latching arm 96 cammingly engages the edge of discharge chute 30 to temporarily pivot lever 90 against the bias of spring element 102 to allow hook end 98 to move underneath the edge of discharge chute 30. Thereafter, with hook end 98 located underneath the edge of the discharge chute, deflector 76 is latched in its guard position.

As shown in FIG. 6, discharge chute 30 is provided with a wedge-shaped projection 116 located adjacent to hook end 98 of locking arm 96. The purpose of projection 16 is to deflect objects emerging from the discharge chute away from the hook end of the locking arm to prevent damage to the locking arm and accidental unlatching of the locking arm by objects emerging from the discharge chute.

The present invention provides a safety deflector assembly for the discharge chute of a power lawn mower which positively maintains the deflector in its guard position to deflect material discharged from the discharge chute toward the ground. The assembly includes a deflector normally located in a guard position in the path of movement of material emerging from the discharge chute and a latching mechanism automatically operable to latch the deflector in its guard position. The deflector assembly provides positive protection against inadvertent movement of the deflector away from its guard position and reduces the risk of injury by material or objects thrown outwardly by the power mower through the discharge chute.

The invention in its broader aspects is not limited to the specific details shown and described, and modifications may be made in the details of the safety deflector assembly without departing from the principles of the present invention.

What is claimed is:
1. A safety deflector assembly for a power lawn mower including a mower body provided with a discharge chute, comprising:
 a deflector including an arm extending from one edge thereof;
 a first pin for pivotally connecting said arm to the mower body to support said deflector for pivotal movement between a guard position located in the path of movement of material discharged from the discharge chute to deflect the material toward the ground and an unguard position out of the path of movement of the discharged material;
 a second pin mounted on said arm and spaced from said first pin;
 a lever including first and second spaced elongated slots for receiving said first and second pins, respectively, to slidably support said lever on said arm for movement between a latching position in engagement with a stop on the mower body to latch said deflector in its guard position and a non-latching position out of engagement with the stop to allow said deflector to pivot from its guard position to its unguard position; and means normally biasing said deflector to its guard position and said lever to its latching position.

2. The deflector assembly of claim 1, wherein said biasing means comprises:
a coil spring element wound around said first pin and including a first arm for engaging the stop to normally bias said deflector to its guard position and a second arm for engaging said lever to normally bias said lever to its latching position.

3. A safety deflector assembly for a power lawn mower including a mower body provided with a discharge chute, comprising:
a deflector including an arm extending from one edge thereof;
a first pin for pivotally connecting said arm to the mower body to support said deflector for pivotal movement between a guard position located in the path of movement of material discharged from the discharge chute to deflect the material toward the ground and an unguard position out of the path of movement of the discharged material;
a second pin mounted on said arm and spaced from said first pin;
a lever including first and second spaced elongated slots for receiving said first and second pins, respectively, to slidably support said lever on said arm for movement between a latching position in engagement with a stop on the mower body to latch said deflector in its guard position and a non-latching position out of engagement with the stop to allow said deflector to pivot from its guard position to its unguard position; and
a common spring element normally biasing said deflector to its guard position and said lever to its latching position.

4. A guard plate assembly for a power mower including a mower body provided with a discharge chute, comprising:
a guard plate pivotally mounted on the mower body above the discharge chute, said guard plate being pivotable between a guard position located in the path of movement of material discharged from the discharge chute to deflect the material downward and an unguard position out of the path of movement of the discharged material, said guard plate including an opening formed therein adjacent to the discharge chute;
a lever pivotally mounted on said guard plate adjacent to said opening, said lever including a latching arm extending downwardly through said opening for engaging the edge of the discharge chute to prevent upward pivotal movement of said guard plate from its guard position to its unguard position, said lever further including a manually engageable actuator arm to permit manual operation of said lever to pivot said latching arm out of engagement with the edge of the discharge chute to allow pivotal movement of said guard plate from its guard position to its unguard position; and
means normally biasing said guard plate to its guard position and said latching arm into engagement with the edge of the discharge chute.

5. A guard plate assembly for a power mower including a mower body provided with a discharge chute, comprising:
a guard plate pivotally mounted on the mower body above the discharge chute, said guard plate being pivotable between a guard position located in the path of movement of material discharged from the discharge chute to deflect the material downward and an unguard position out of the path of movement of the discharged material, said guard plate including an opening formed therein adjacent to the discharge chute;
a lever pivotally mounted on said guard plate adjacent to said opening, said lever including a latching arm extending downwardly through said opening for engaging the edge of the discharge chute to prevent upward pivotal movement of said guard plate from its guard position to its unguard position, said lever further including a manually engageable actuator arm to permit manual operation of said lever to pivot said latching arm out of engagement with the edge of the discharge chute to allow pivotal movement of said guard plate from its guard position to its unguard position; and
means including a common spring element normally biasing said guard plate to its guard position and said latching arm into engagement with the edge of the discharge chute.

6. A guard plate assembly for a power lawn mower including a mower body provided with a discharge chute, comprising:
a discharge guard plate pivotally mounted on the mower body above the discharge chute, said guard plate being pivotable between a guard position located in the path of movement of material discharged from the discharge chute to deflect the material downward and an unguard position out of the path of movement of the discharged material;
a lever slidably mounted on said guard plate, said lever being normally biased to a latching position in engagement with a stop on the mower body to latch said guard plate in its guard position, said lever being manually slidable to a nonlatching position out of engagement with the stop to allow said guard plate to pivot from its guard position to its unguard position; and
a unitary spring for normally biasing said guard plate toward its guard position and said lever toward its latching position, said spring including a coil portion applying torsion force to said guard plate about its pivot, and an arm portion applying longitudinal sliding force to said lever.

7. In combination with a power lawnmower including a mower body provided with a discharge chute:
a discharge guard plate pivotally mounted on the mower body above the discharge chute, said guard plate being pivotable between a guard position located in the path of movement of material discharged from the discharge chute to deflect the material downward and an unguard position out of the path of movement of the discharged material; and
a displaceable latching member comprising a lever, means mounting said lever for sliding movement on said guard plate for latching said guard plate in its guard position; said latching member being manually movable to an unlatch position to allow movement of said guard plate to its unguard position; one spring means for biasing said guard plate to its guard position and for biassing said latching member to its latch position; and means for preventing said latch member from reaching its latch position unless said guard plate is in its guard position.

8. The combination claimed in claim 7 wherein a stop is provided on said mower body to engage said lever in its latching position, and wherein said lever includes a cam surface slidable on said stop to prevent said lever from engaging said stop unless said guard plate is in its guard position.

* * * * *